(12) United States Patent
Nakamura et al.

(10) Patent No.: US 8,636,841 B2
(45) Date of Patent: Jan. 28, 2014

(54) CEMENT MANUFACTURING APPARATUS AND METHOD

(75) Inventors: Tomomichi Nakamura, Kumagaya (JP); Yukinori Sakamoto, Kumagaya (JP); Tsuyoshi Matsura, Kumagaya (JP)

(73) Assignee: Taiheiyo Cement Corporation, Akashi-cho, Chuo-ku, Tokyo (JP)

( * ) Notice: Subject to any disclaimer, the term of this patent is extended or adjusted under 35 U.S.C. 154(b) by 0 days.

(21) Appl. No.: 13/368,222

(22) Filed: Feb. 7, 2012

(65) Prior Publication Data

US 2012/0167806 A1    Jul. 5, 2012

Related U.S. Application Data

(62) Division of application No. 12/517,759, filed as application No. PCT/JP2007/073140 on Nov. 30, 2007, now abandoned.

(30) Foreign Application Priority Data

Dec. 5, 2006   (JP) .................................. 2006-327810

(51) Int. Cl.
*B03B 5/60*   (2006.01)
*B03B 5/64*   (2006.01)
*B03D 1/00*   (2006.01)
*B07B 7/00*   (2006.01)
*B03B 7/00*   (2006.01)
*B07B 9/00*   (2006.01)
*B07B 13/00*  (2006.01)
*F23J 3/00*   (2006.01)
*C04B 14/00*  (2006.01)
*C04B 18/06*  (2006.01)

(52) U.S. Cl.
USPC .............. 106/772; 106/705; 209/13; 209/18; 209/47; 209/163; 110/344

(58) Field of Classification Search
USPC .......................... 110/344; 209/13, 18, 47, 163
See application file for complete search history.

(56) References Cited

U.S. PATENT DOCUMENTS 6,203,598 B1 *   3/2001   Hasegawa et al. ................ 95/92
2007/0199486 A1 *  8/2007   Saito et al. ..................... 110/344

FOREIGN PATENT DOCUMENTS

JP   2005104792 A  *  4/2005
WO  WO 2005035134 A1 *  4/2005

* cited by examiner

*Primary Examiner* — Kaj K Olsen
*Assistant Examiner* — Karam Hijji
(74) *Attorney, Agent, or Firm* — Stetina Brunda Garred & Brucker

(57) ABSTRACT

A cement manufacturing apparatus capable of increasing quantity of fly ash used in the apparatus while controlling unburned carbon content in cement within a permissible range. The cement manufacturing apparatus comprises a removal means for removing unburned carbon from gypsum, and a grinding means for grinding gypsum from which unburned carbon is removed by the removal means together with clinker to generate cement. With the apparatus, total unburned carbon content in cement can be reduced, and the quantity of fly ash used in the apparatus can be, increased by the reduced amount of unburned carbon. The removal means can remove unburned carbon contained in gypsum as well as unburned carbon contained in fly ash, and the grinding means may grind the fly ash from which unburned carbon is removed together with the gypsum, from which unburned carbon is removed, and clinker.

15 Claims, 1 Drawing Sheet

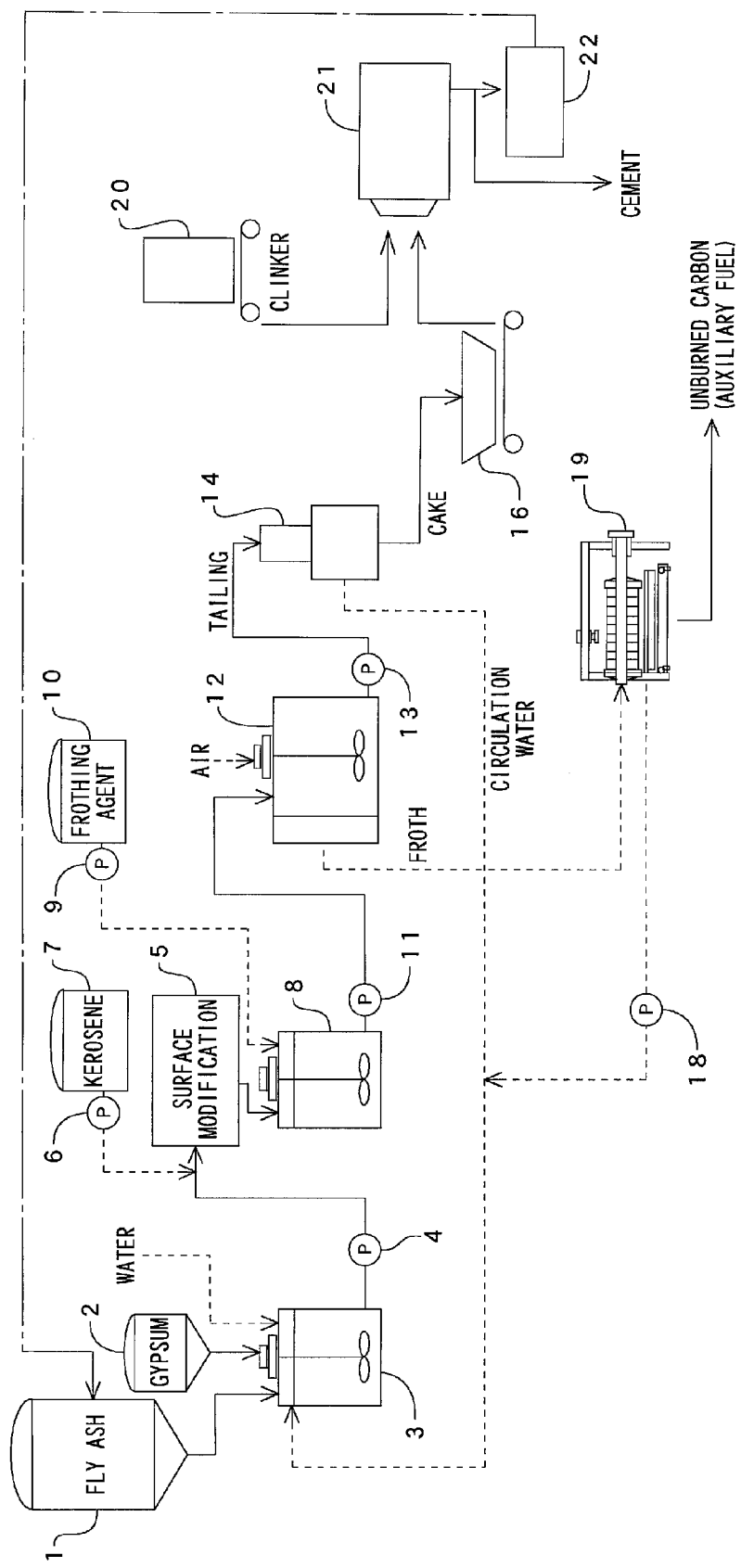

CEMENT MANUFACTURING APPARATUS AND METHOD

CROSS-REFERENCE TO RELATED APPLICATIONS

The present application is a divisional application of U.S. application Ser. No. 12/517,759 filed on Jul. 21, 2009 now abandonded, which claims priority to International Application No. PCT/JP2007/073140 filed on Nov. 30, 2007, which claims priority to Japanese Patent Application No. 2006-327810 filed on Dec. 5, 2006.

STATEMENT RE: FEDERALLY SPONSORED RESEARCH/DEVELOPMENT

Not Applicable

BACKGROUND OF THE INVENTION

1. Technical Field of the Invention

The present invention relates to a cement manufacturing apparatus and method, and more particularly to the apparatus and the method capable of increasing quantity of fly ash used in the apparatus while controlling unburned carbon content of cement within a permissible range. 2. Description of the Related Art Fly ash generated in coal firing power plants and the like has been used for cement admixture, concrete admixture, raw materials for artificial lightweight aggregates, etc. In these cases, since fly ash containing much unburned carbon causes various problems it is necessary to remove the unburned carbon, so that many techniques have been proposed. Particularly, when fly ash is utilized for cement admixture, it is thought that adding wet ash that is obtained after decarbonization by wet flotation to materials fed to a cement mill is the best method to reduce costs of equipment and operation.

Therefore, when utilizing fly ash as a cement admixture, the following method was utilized. The method comprises the steps of: generating slurry by adding water to fly ash; adding frothing agent to the slurry; generating air bubbles while agitating the slurry; causing unburned carbon contained in the fly ash to adhere to these air bubbles; removing the unburned carbon from the fly ash by removing the air bubbles; and grinding the fly ash together with clinker by a cement mill (exemplarily described in patent document 1).

Patent document 1: Japanese Patent No. 3613347 gazette

BRIEF SUMMARY OF THE INVENTION

As described above, since unburned carbon contained in cement becomes factors of various harmful effects, when fly ash is mixed to cement, it is necessary to decrease quantity of unburned carbon contained in cement after the mixing as much as possible. On the other hand, today, waste treatment is becoming more and more difficult, and efficient use of waste material such as the fly ash is rated as one of an important issue, and it is extremely eagerly desired to utilize more fly ash in a cement manufacturing process.

However, even if unburned carbon contained in fly ash is removed with the above-mentioned method, since the quantity of unburned carbon eliminated is limited, it is difficult to perfectly remove unburned carbon contained in fly ash. Therefore, in order to keep unburned carbon content of the cement in a permissible range, the quantity of the fly ash used should be limited, so that it is extremely difficult to increase the quantity of fly ash used.

The present invention has been made in consideration of the above problems in the conventional art, and the object thereof is to provide an apparatus and a method capable of increasing quantity of fly ash used in the apparatus while controlling unburned carbon content of cement within a permissible range.

The present inventors have extensively studied to accomplish the above objects and found that unburned carbon contained in cement to which fly ash is mixed includes unburned carbon in the fly ash as well as that contained in gypsum, and removing unburned carbon from gypsum before mixing it to clinker allows unburned carbon content of cement to extremely be decreased.

The present invention has been made based on the above knowledge, and a cement manufacturing apparatus according to the present invention is characterized by comprising: a removal means for removing unburned carbon from gypsum; and a grinding means for grinding the gypsum from which the unburned carbon is removed by the removal means together with clinker to generate cement.

With the present invention, it becomes possible to reduce unburned carbon content of cement by the quantity of unburned carbon that is removed from gypsum by the removal means. In addition, when fly ash is utilized in a cement manufacturing process, since the quantity of fly ash used in the apparatus can be increased by the amount of unburned carbon that is removed from gypsum by the removal means, which allows the quantity of fly ash used in the apparatus to be increased while controlling unburned carbon content of cement within a permissible range.

The cement manufacturing apparatus described above may be constructed such that the removal means removes unburned carbon from the gypsum and fly ash, and the grinding means grinds the fly ash from which the unburned carbon is removed together with the gypsum from which the unburned carbon is removed and the clinker. With this construction, the removal means commonly used to remove unburned carbon from fly ash and from gypsum, so that it is possible to prevent increase in facility cost and operation cost.

In the above cement manufacturing apparatus, the removal means can simultaneously remove the unburned carbon from the fly ash and the gypsum, which allows the time and operation cost for removal treatment to further be reduced.

The above cement manufacturing apparatus may further comprises: a measuring means for measuring unburned carbon content of the cement generated by the grinding means; and a calculating means for calculating quantity of the fly ash mixed to the cement based on the measurements by the measuring means. Setting the quantity of fly ash mixed based on calculated value by the calculation means may certainly prevents unburned carbon content of cement from exceeding a permissible value due to excessive mixing of fly ash, and fly ash can be mixed a little less than the limit where unburned carbon content of cement is maintained in the permissible range, which also allows fly ash to efficiently be used while maintaining prescribed cement quality.

Further, a cement manufacturing method according to the present invention is characterized by comprising the steps of: removing unburned carbon from gypsum; and generating cement by grinding the gypsum from which the unburned carbon is removed together with clinker. With this method, like the above inventions, it becomes possible to increase the quantity of fly ash used while maintaining unburned carbon content of cement in a permissible range.

In the cement manufacturing method described above, unburned carbon is removed from fly ash while the unburned carbon is removed from the gypsum, and the fly ash from which the unburned carbon is removed is ground together with the gypsum from which the unburned carbon is removed and the clinker.

Further, in the above cement manufacturing method, the unburned carbon may simultaneously be removed from the fly ash and the gypsum.

Still further, in the above cement manufacturing method, it is possible to measure unburned carbon content of the cement, and to calculate quantity of the fly ash mixed to the cement based on the measurements.

As mentioned above, with the present invention, it becomes possible to provide a cement manufacturing apparatus and method capable of increasing quantity of fly ash used in the apparatus while controlling unburned carbon content of cement within permissible range.

BRIEF DESCRIPTION OF THE DRAWINGS

FIG. 1 is a flow chart exemplarily showing a system to which a cement manufacturing apparatus and method according to the present invention are applied.

DETAILED DESCRIPTION OF THE INVENTION

FIG. 1 shows an example of a system composition to which a cement manufacturing apparatus and method according to the present invention are applied, and this system roughly comprises a fly ash tank 1, a gypsum tank 2, a slurry tank 3 for generating slurry by adding water to fly ash and gypsum, a surface modifier 5 for adding sharing force to slurry after adding collector to the slurry to modify the surface of unburned carbon, an adjustment tank 8 for generating air bubbles by adding frothing agent to slurry, a flotation machine 12 for separating unburned carbon from fly ash and gypsum by causing the unburned carbon to adhere to the air bubbles and making them float, a solid/liquid separator 14 for solid/liquid separating tailing from the flotation machine 12, a filter press 19 for obtaining unburned carbon by solid/liquid separating froth from the flotation machine 12, a clinker silo 20 for storing clinker, a cement mill 21 for generating cement by grinding clinker, fly ash and gypsum, a feed rate controller 22 for measuring unburned carbon content of cement that is sampled from the cement generated and controlling feed rate of the fly ash from the fly ash tank 1 based on the measurements and so on.

The fly ash tank 1 is installed to store fly ash that is carried into as waste material from coal firing power plants and others, and to feed fly ash to the slurry tank 3 by the quantity ordered by the feed rate controller 22. And, the gypsum tank 2 is installed to store gypsum generated in flue gas desulfurization devices or the like of thermal power plants, etc., and to feed the gypsum to the slurry tank 3 by the quantity in accordance with feed rate of clinker to the feed rate controller 22.

The slurry tank 3 is provided to generate slurry from fly ash, gypsum and water, and has agitation vanes for agitating the slurry therein. Upstream of the slurry tank 3 are disposed the fly ash tank 1, the gypsum tank 2 and a water supplier, and downstream of the slurry tank 3 is installed a pump 4 for feeding the slurry to the surface modifier 5.

The surface modifier 5 is installed to modify the surface of unburned carbon by adding shearing force to the slurry and collector and to ultrafinely grind particles contained in the slurry. Upstream of the surface modifier 5 are installed a kerosene tank 7 for storing kerosene as collector and a pump 6 for feeding the kerosene to the surface modifier 5.

The adjustment tank 8 is installed to add frothing agent fed from a frothing agent tank 10 through a pump 9 to the slurry and collector from the surface modifier 5 and to mix them, and has agitation vanes therein. Downstream of the adjustment tank 8 is disposed a pump 11 for transporting slurry to the flotation machine 12.

The flotation machine 12 makes unburned carbon contained in fly ash and gypsum adhere to air bubbles and float to depart the unburned carbon from the fly ash and gypsum. Above the flotation machine 12 is installed an air supplier for feeding air for generating air bubbles, and downstream of the flotation machine 12 is disposed a pump 13 for transporting tailing to the solid/liquid separator 14.

The solid/liquid separator 14 is installed to solid/liquid separate the tailing including fly ash and gypsum that is discharged from the flotation machine 12, and separate the tailing into cake and water. The cake separated, that is, fly ash and gypsum (products) from which unburned carbon is removed, are fed to a cake hopper 16 and are temporarily stored therein. On the other hand, the water separated is returned to the slurry tank 3.

The filter press 19 is provided to solid/liquid separate the froth including unburned carbon from the flotation machine 12, and the unburned carbon contained in the cake separated may be utilized as a fuel. And, water discharged from the filter press 19 may be recycled in the slurry tank 3 and the like through the pump 18.

The cement mill 21 is mounted to generate cement by grinding cake fed from the cake hopper 16 together with clinker fed from the clinker silo 20.

Next, a cement manufacturing method with the above system according to the present invention will be explained with reference to FIG. 1.

To the slurry tank 3 is fed fly ash from the fly ash tank 1 and gypsum from the gypsum tank 2, and those are mixed with water to generate slurry. Here, the concentrations of fly ash and gypsum in the slurry are adjusted to 3-25 mass percent and 6-50 mass percent respectively.

Next, slurry including fly ash and gypsum in the slurry tank 3 is fed to the surface modifier 5 via the pump 4. On the other hand, to the surface modifier 5 is fed kerosene as collector from the kerosene tank 7 via the pump 6. Other than kerosene, generally used collector such as light oil and heavy oil may be used. The quantity of the collector added is adjusted in a range between 5 to 10 mass percent of total unburned carbon in the fly ash and gypsum.

Next, in the surface modifier 5, shearing force is added to the slurry and collector, and particles contained in the slurry are ultrafinely ground. The slurry and collector to which shearing force is added and other treatment is performed are discharged from the surface modifier 5 and are fed to the adjustment tank 8. Together with the above, frothing agent is fed to the adjustment tank 8 through the pump 9, and in the adjustment tank 8, slurry, collector and the frothing agent are mixed.

Next, the slurry and collector are fed to the flotation machine 12, and air is fed to the flotation machine 12, in the flotation machine 12, air bubbles are generated, to which unburned carbon that is absorbed to the collector is adhered, and floating air bubbles with unburned carbon attached thereto are removed.

Next, froth including unburned carbon that is discharged from the flotation machine 12 is solid/liquid separated by the filter press 19 to collect unburned carbon. Water separated by the filter press 19 may be reused by newly feeding it to the slurry tank 3 via the pump 18 or by using it to eliminate air bubbles when unburned carbon is adhered to air bubbles.

On the other hand, tailing including fly ash and gypsum from the flotation machine 12 are solid/liquid separated by the solid/liquid separator 14. When water content of the cake is high, unburned carbon discharged from the filter press 19 is dried by utilizing hot wind that is obtained through combustion of unburned carbon discharged from the filter press 19 in a blast furnace or the like, and fly ash of which unburned carbon content is 1 mass percent or lower and gypsum of which unburned carbon content is 0.5 mass percent or lower are fed to the cake hopper 16.

Next, clinker is fed to the cement mill 21 from the clinker silo 20 and cake is fed to the cement mill 21 from the cake hopper 16, in the cement mill 21, together with the clinker, fly ash and gypsum from which unburned carbon is removed are ground to generate cement.

Next, in the feed rate controller 22, a part of cement generated by the cement mill 21 is sampled to measure unburned carbon content, and the quantity of fly ash added, that is, the amount of fly ash which can be mixed, is calculated based on the measurements. Here, at first, a difference between a permissible value or a target that is less or equal to the permissible value of unburned carbon content and a measured value is calculated, and from the difference, the amount of fly ash that can be added is inversely calculated. After that, the quantity of fly ash added, which is calculated by the above process, and the quantity of fly ash currently added are summed up, and the sum is set as the quantity of fly ash fed to the slurry tank 3. Meanwhile, in the present embodiment, since fly ash from which unburned carbon is removed is fed to the cement mill 21, the quantity of fly ash added is calculated in such a manner that unburned carbon content of fly ash is approximately 1 mass percent.

Next, from the feed rate controller 22 to the fly ash tank 1, the quantity of fly ash fed to the slurry tank 3 is ordered to control feed rate of fly ash from the fly ash tank 1. In this connection, as for gypsum, the quantity of the material added has much influence upon setting time of concrete, so that prescribed quantity is determined in accordance with desired property of cement.

As described above, with this embodiment, after both unburned carbon contained in fly ash and gypsum is removed, the fly ash and gypsum are ground together with clinker to generate cement, so that in comparison that only unburned carbon in fly ash is removed, total unburned carbon content of cement can be reduced, by the difference, the quantity of fly ash used may be increased.

In addition, with the present embodiment, a device for removing unburned carbon is commonly used for fly ash and gypsum, which may hold down facility investment, and prevent treatment cost from increasing. Further, unburned carbon is simultaneously removed from gypsum while removing unburned carbon from fly ash, which allows time required for the removal treatment to be shortened, resulting in further decrease in treatment cost.

Still further, with the present embodiment, a part of cement generated by the cement mill 21 is sampled; unburned carbon content thereof is measured; and feed rate of fly ash is determined based on the measurements, so that it becomes possible to securely prevent unburned carbon content of cement from exceeding a permissible value due to excessive feed of fly ash, and to feed fly ash a little less than the limit where unburned carbon content of cement is maintained in the permissible range, which also allows fly ash to efficiently be used while maintaining prescribed cement quality.

Meanwhile, in the above embodiment, after simultaneously removing unburned carbon contained in fly ash and gypsum, fly ash and gypsum from which unburned carbon is removed are fed to the cement mill 21. It is also possible that the treatment for removing unburned carbon from fly ash and the treatment for removing unburned carbon from gypsum are carried out in separate processes.

In addition, although in the above embodiment, unburned carbon contained in fly ash and unburned carbon contained in gypsum are removed with a wet separation method, those may be separated from fly ash and gypsum through a dry separation method using electrostatic separation.

Still further, in the embodiment described above, with the feed rate controller 22, feed rate of fly ash from the fly ash tank 1 is automatically controlled. It is also possible that an operator measures unburned carbon content of cement discharged from the cement mill 21; calculates the quantity of fly ash fed based on the measurements; and sets feed rate of fly ash from the fly ash tank 1 based on the calculated feed rate.

[Explanation of Signals]
1 fly ash tank
2 gypsum tank
3 slurry tank
4 pump
5 surface modifier
6 pump
7 kerosene tank
8 adjustment tank
9 pump
10 frothing agent tank
11 pump
12 flotation machine
13 pump
14 solid/liquid separator
16 cake hopper
18 pump
19 filter press
20 clinker silo
21 cement mill
22 feed rate controller

The invention claimed is:

1. A cement manufacturing method comprising the steps of:
generating slurry by adding water to fly ash and gypsum, the fly ash and gypsum including unburned carbon;
removing at least a portion of unburned carbon from the fly ash and gypsum;
generating cement using the gypsum and fly ash from which the unburned carbon is removed;
measuring an unburned carbon content in the generated cement;
generating cement subsequent to the measuring step; and
adjusting the amount of fly ash used in generating the cement subsequent to the measuring step based on the measured content of unburned carbon in the cement generated prior to the measuring step.

2. The cement manufacturing method as claimed in claim 1, wherein unburned carbon is removed from fly ash while said unburned carbon is removed from the gypsum, and the fly ash from which the unburned carbon is removed is ground together with the gypsum from which the unburned carbon is removed and clinker.

3. The cement manufacturing method as claimed in claim 2, wherein said unburned carbon is simultaneously removed from the fly ash and the gypsum.

4. The cement manufacturing method as claimed in claim 2 further comprising the steps of:
Calculating a quantity of the fly ash to be used in generating the cement subsequent to the measuring step based on the measured unburned carbon content in the cement generated prior to the measuring step.

5. The cement manufacturing method as claimed in claim 3 further comprising the steps of:
   Calculating a quantity of the fly ash to be used in generating the cement subsequent to the measuring step based on the measured unburned carbon content in the cement generated prior to the measuring step.

6. The cement manufacturing method as claimed in claim 1, further comprising the step of removing unburned carbon from the fly ash.

7. The cement manufacturing method as claimed in claim 1, wherein the adjusting step includes defining a permissible amount of unburned carbon in the cement generated prior to the measuring step, and increasing the amount of fly ash used in generating the cement subsequent to the measuring step when the measured unburned carbon content of the cement generated prior to the measuring step is below the permissible amount, and decreasing the amount of fly ash used in generating the cement subsequent to the measuring step when the measured unburned carbon content of the cement generated prior to the measuring step is above the permissible amount.

8. The cement manufacturing method as claimed in claim 1, further comprising the step of calculating a quantity of the fly ash to be mixed into the cement generated subsequent to the measuring step based on the measured unburned carbon content of the cement generated prior to the measuring step.

9. A cement manufacturing method comprising the steps of:
   generating slurry by adding water to fly ash and gypsum, the fly ash and gypsum including unburned carbon;
   removing at least a portion of the unburned carbon from the fly ash and gypsum;
   generating cement using the gypsum and fly ash from which the unburned carbon is removed;
   measuring an unburned carbon content in the generated cement; and
   calculating a quantity of fly ash to be used in generating additional cement subsequent to the measuring step based on the measured unburned carbon content in the cement generated prior to the measuring step.

10. The cement manufacturing method as claimed in claim 9, further comprising the step of removing unburned carbon from the fly ash.

11. The cement manufacturing method as claimed in claim 10, wherein unburned carbon is simultaneously removed from the fly ash and the gypsum.

12. The cement manufacturing method as claimed in claim 1, wherein the adjusting step includes increasing the amount of fly ash used in generating the cement subsequent to the measuring step when the measured unburned carbon content in the cement generated prior to the measuring step is less than a permissive value.

13. The cement manufacturing method as claimed in claim 12, wherein the adjusting step further includes decreasing the amount of fly ash used in generating the cement subsequent to the measuring step when the measured unburned carbon content in the cement generated prior to the measuring step is more than a permissive value.

14. The cement manufacturing method as claimed in claim 9, further comprising the step of:
   generating the cement subsequent to the measuring step using the gypsum from which the unburned carbon is removed together with the calculated amount of fly ash.

15. The cement manufacturing method as claimed in claim 9, wherein the calculating step includes:
   comparing the measured value of unburned carbon in the cement generated prior to the measuring step with a permissible value of unburned carbon content in the cement generated prior to the measuring step; and
   increasing the amount of fly ash used in generating the cement subsequent to the measuring step when the measured value of the unburned carbon in the cement generated prior to the measuring step is below the permissible value of unburned carbon content in the cement generated prior to the measuring step and decreasing the amount of fly ash used in generating the cement subsequent to the measuring step when the measured value of the unburned carbon in the cement generated prior to the measuring step is above the permissible value of the unburned carbon in the cement generated prior to the measuring step.

* * * * *